Sept. 8, 1964  A. W. GAUBATZ  3,147,712
FUEL PUMPING SYSTEM FOR GAS TURBINES
Filed Sept. 2, 1960  2 Sheets-Sheet 1
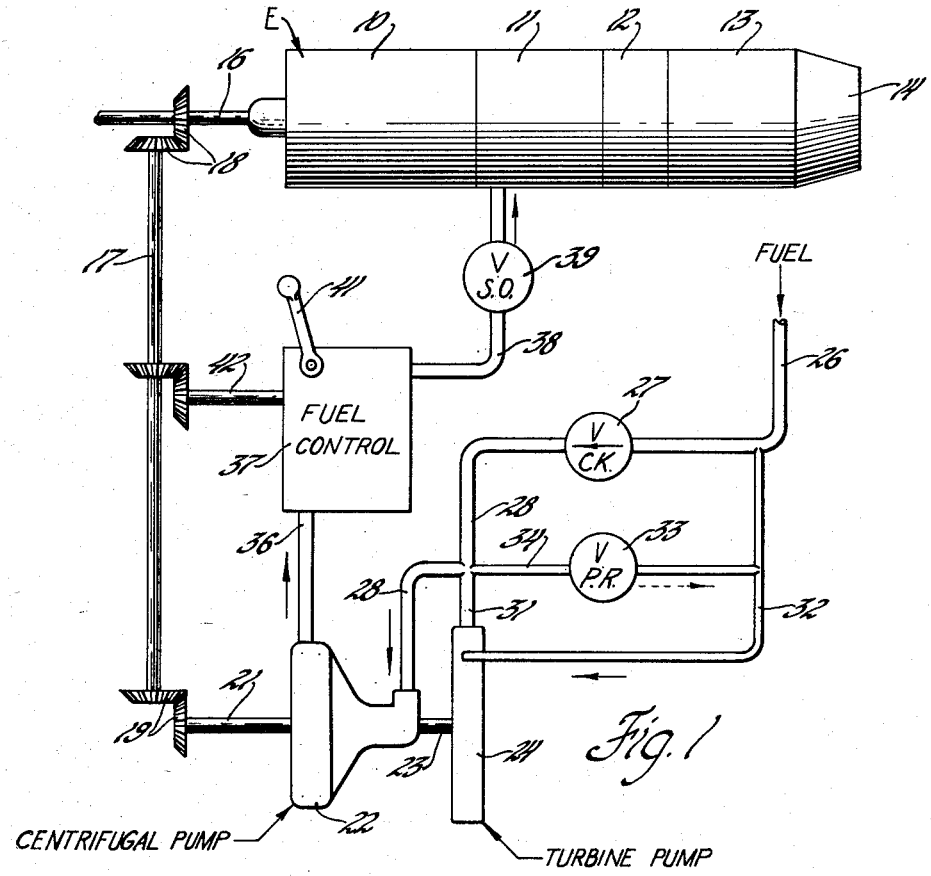
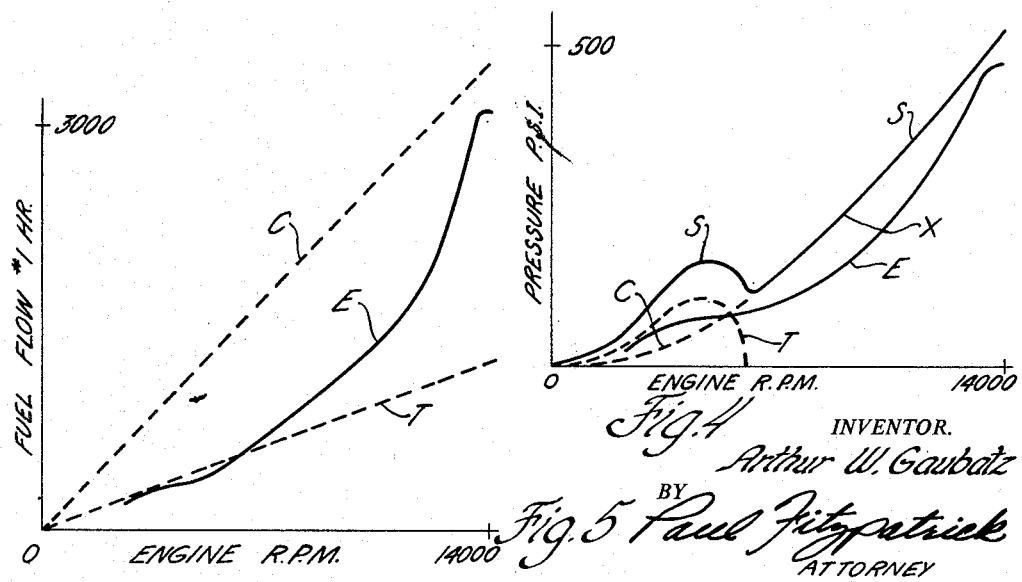
INVENTOR.
Arthur W. Gaubatz
BY Paul Fitzpatrick
ATTORNEY Sept. 8, 1964     A. W. GAUBATZ     3,147,712
FUEL PUMPING SYSTEM FOR GAS TURBINES
Filed Sept. 2, 1960     2 Sheets-Sheet 2
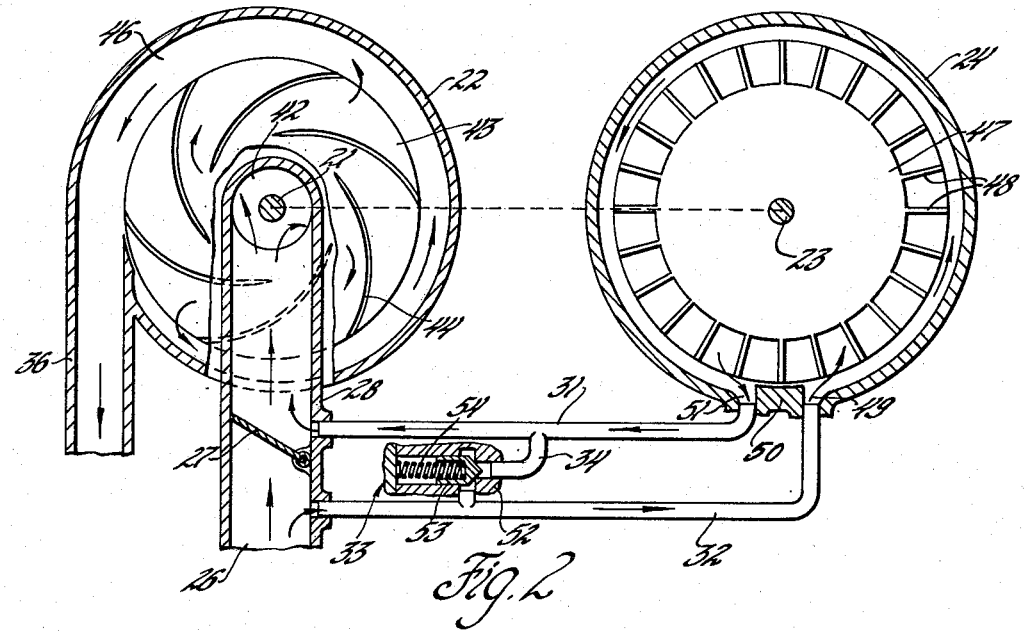
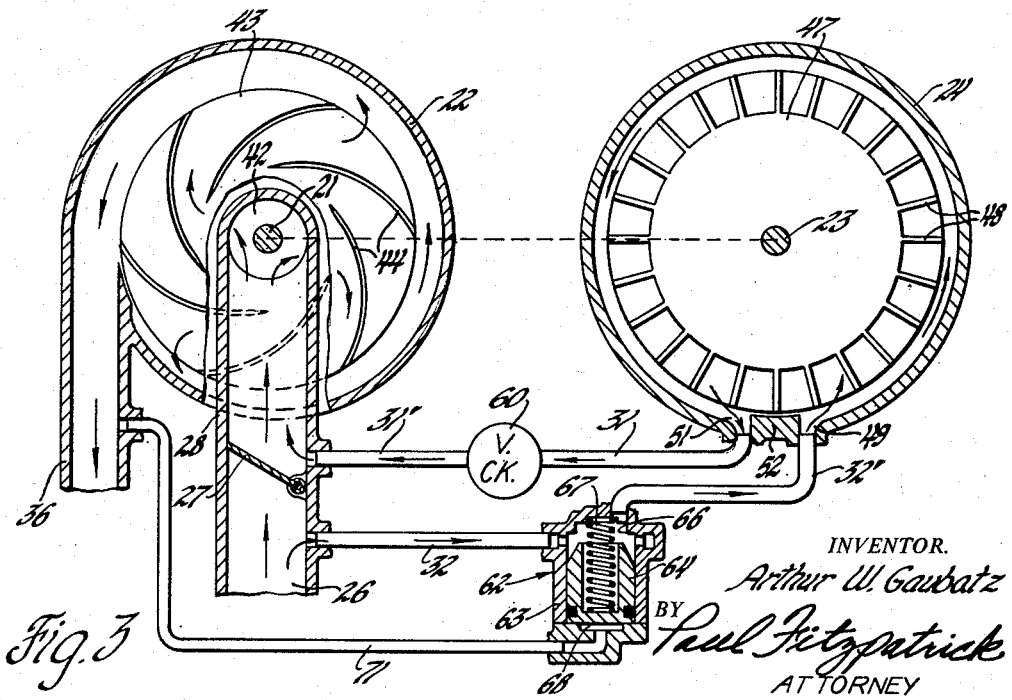
INVENTOR.
Arthur W. Gaubatz
BY Paul Fitzpatrick
ATTORNEY

3,147,712
FUEL PUMPING SYSTEM FOR GAS TURBINES
Arthur W. Gaubatz, Indianapolis, Ind., assignor to General Motors Corporation, Detroit, Mich., a corporation of Delaware
Filed Sept. 2, 1960, Ser. No. 53,663
8 Claims. (Cl. 103—5)

My invention is directed to fuel pumping systems particularly suited to the characteristics and requirements of gas turbine engines. The normal or typical gas turbine engine requires a supply of fuel at very considerable pressure over a wide range of engine speed. For example, the speed at which fuel is introduced in starting such an engine may be about 20% of the maximum operating speed of the engine. While there are exceptions, the usual gas turbine engine relies upon fuel pressure to atomize the fuel for proper combustion, and the fuel is delivered into a combustion chamber which may be at quite substantial pressure. The engine fuel requirement is ordinarily something like one-half pound per horsepower-hour.

By way of example, a well-known turbo-prop aircraft engine of about 4000 horsepower may consume fuel at a rate up to 3000 pounds per hour during engine acceleration and has fuel manifold pressures up to nearly 500 pounds per square inch.

Because of the high pressure required, positive displacement pumps are ordinarily used to supply such engines. The most satisfactory positive displacement pump so far has been the gear pump, which is reliable but heavy and subject to rather rapid wear due to solid matter in the fuel. In order for the gear pump to meet the engine requirements at all speeds, it must be of such a size that, under many operating conditions, the greater part of the capacity of the pump is in excess of engine requirements. Since no satisfactory variable capacity gear pump has been found, the excess pump discharge must be throttled back into the pump inlet with very considerable attendant heating of the fuel and waste of power in driving the pump.

The disadvantage of the gear pump arising from its constant displacement may be avoided by the use of a variable displacement plunger type pump. However, these pumps require very precise workmanship, are complicated, expensive, heavy, and much more susceptible to damage resulting from contaminants in the fuel.

There are many reasons why a centrifugal pump is desirable for the sort of service to which we have referred; they include maximum reliability because of simplicity, small size, light weight, and relative immunity to damage from contaminated fuel. Other advantages are the fact that no additional boost pump is required to supply the centrifugal pump. There are no pulsations or vibrations in the output from a centrifugal pump as in a positive-displacement pump. Another important advantage is the fact that delivery of fuel to the engine can be controlled by a throttling type fuel control rather than a bypassing type control, with the result that there is minimum temperature rise of the fuel and power loss in the pump.

In general, the characteristics of the centrifugal pump are that pressure rise through the pump is proportional to the square of the speed; delivery is directly proportional to the speed, for a given pressure; with backwardly curved rotor vanes, pressure rises slightly as the delivery is decreased by throttling, thus providing for stable control; and, pump efficiency remains fairly constant over a considerable range of delivery. The pressure-against-speed characteristic of the centrifugal pump makes it unsuitable alone for the main fuel supply of a gas turbine. To achieve the good fuel atomization which is necessary for good starting and operation of the engine, duplex fuel nozzles are required to accommodate the very wide variation in flow to the gas turbine as operating conditions change. With a duplex nozzle, the pressure required in the starting condition with the engine operating at low speed is considerably lower than that at the high speed run condition of the engine, but much higher than would accord with the previously mentioned quadratic pressure-against-speed characteristic of the centrifugal pump. In short, a centrifugal pump which would meet the pressure requirements at low engine speed would provide extremely high pressures at rated engine speed with consequent excessive power input and temperature rise. A standard centrifugal pump of moderate size operating at moderate speeds can deliver the necessary volume and pressure to satisfy the maximum fuel requirements of the engine at normal operating speeds, but such a pump will not meet starting requirements.

In accordance with my invention, the inadequacy of the centrifugal pump at low engine speeds may be overcome by suitably combining it with an appropriate pump of the known turbine or regenerative type, hereinafter called "turbine pumps." In these pumps, the fluid enters and leaves at the periphery of the wheel and, as it moves around the housing from the inlet to the outlet of the pump, it passes from the inner low pressure region of the wheel to the outer high pressure region a number of times, gathering more energy and pressure at each such passage. A typical turbine pump will deliver some four times as much pressure at rated flow as a centrifugal pump of the same size running at the same speed. It has a high pressure in the blocked outlet condition. The pressure of the turbine pump drops off very rapidly as the flow increases above the rated value, and will drop to zero at about 130% rated flow.

It will be seen, therefore, that the turbine pump has the advantages of simplicity, compactness, light weight, lack of sensitivity to dirt, and continuous delivery already mentioned with respect to the centrifugal pump. However, it does not have nearly as great flow capacity for the same dimensions. Also, it does not lend itself readily to control of the output by throttling because of the high pressure as the outlet is blocked off and the high power required to drive the turbine pump under such conditions.

The characteristics and advantages of these two types of pumps are, of course, known to those skilled in the hydraulic arts and such knowledge has resulted in a proposal, published in U.S. Patent No. 2,785,634, to use a turbine pump to prime a two-stage centrifugal pump feeding a gas turbine engine.

So far as I am aware, however, no one has yet discerned a practical and workable means of utilizing the turbine and centrifugal pumps in combination so as to provide a suitable and attractive gas turbine fuel pumping system.

The nature of my invention may be summarized or outlined generally by stating that its involves utilizing the high pressure characteristic of the turbine pump to satisfy engine fuel requirements under low speed conditions such as during starting or very low speed running of the engine. It employs the high capacity and amenability to throttling of the centrifugal pump to supply fuel to the engine for normal running. At low speeds the centrifugal pump passes, but only slightly augments the pressure of, the fuel delivered by the turbine pump. At normal engine speeds, the engine fuel requirement is substantially in excess of the capacity of the turbine pump, and means are provided whereby the turbine pump runs idle. The invention also may desirably include means by which the turbine pump is emptied under normal running conditions so as to reduce pumping losses and fluid heating due to the idle circulation of fuel in the turbine pump.

The objects of the invention are to improve fuel pumping systems of gas turbine engines or other fuel consumers having similar characteristics, and to provide a pumping system embodying rotary dynamic pumps particularly suitable for gas turbine engines.

The nature of the invention and the advantages thereof will be apparent to those skilled in the art from the succeeding detailed description of two preferred embodiments thereof and the accompanying drawings.

FIGURE 1 is a schematic diagram of a gas turbine fuel system;

FIGURE 2 is a quasi-structural schematic drawing of the pump portion of the system of FIGURE 1;

FIGURE 3 is a drawing similar to FIGURE 2 of a second embodiment of the invention;

FIGURES 4 and 5 are charts explanatory of the operation of the system.

Referring first to FIGURE 1, there is illustrated a gas turbine engine E which may be a turbojet or turboshaft (including turboprop) type. The engine may, as usual, include a compressor 10, a combustion section 11, a turbine 12, and an exhaust duct 13 terminating in a jet nozzle 14. In the operation of the engine, the turbine 12 drives the compressor 10, which forces air through the combustion apparatus 11 in which fuel is burned to provide a motive fluid for the turbine. The turbine exhaust is discharged through the nozzle 14 and may provide a propulsive jet. The engine may also drive a power output shaft 16 which may be coupled to any driven device including a propeller or lifting rotor of an aircraft, for example. The engine may be of any ordinary type including single spool, gas coupled, or dual spool.

As is customary, the engine provides the power to drive certain accessory devices including pumps to supply fuel to the engine. The drive for such purposes is provided by an accessory drive shaft 17 driven from the engine shaft 16 through gearing 18 and coupled through gearing 19 to the shaft 21 of a centrifugal pump 22. The shaft 23 of a turbine pump 24 is coupled to the shaft 21. As a practical matter, such pumps may well be combined into a common assembly, but the schematic showing indicates them as separate.

Fuel will be supplied from any suitable source such as a fuel tank (not shown) or an aircraft boost or transfer pump (not shown) through a line 26 which leads through a check valve 27 to a line 28 leading to the inlet of the centrifugal pump 22 and a line 31 leading from the outlet of the turbine pump 24. A line 32, which may be of smaller capacity than the lines 26 and 28, branches from the line 26 and runs to the inlet of the turbine pump. A pressure relief valve 33 is connected in a conduit 34 which connects the inlet and outlet of the turbine pump by way of lines 31 and 32. It will be seen, therefore, that fuel may flow to the centrifugal pump either through the turbine pump or through check valve 27 and that, if the pressure rise of the turbine pump becomes too great, it will be limited by opening of the relief valve 33. The engine E is supplied with fuel from the outlet of the centrifugal pump 22 through a delivery line 36, an engine fuel control 37, and a line 38 which may, as usual, include a manually operable shut-off valve 39 employed to shut down the engine.

The fuel control 37 may be of any usual or suitable type and may respond to an engine power output or speed setting or signal supplied by manual operation of a power control lever 41 suitably coupled to the fuel control.

The fuel control also may include engine governors and fuel metering means responsive to engine speed actuated by a shaft 42 driven by the engine. The fuel control 37 may also respond to parameters indicative of engine fuel requirements or acceleration and deceleration fuel limits, such as engine inlet air temperature and pressure or compressor discharge pressure and may include any suitable safety device or limiters for engine speed, temperature or pressure. In short, the fuel control may be of any suitable type. It need not include the usual means for bypassing excess pump output, since the output of my pumping system may be controlled simply by throttling.

FIGURE 2 illustrates the pumping part of the system shown in FIGURE 1 more structurally, although no attempt is made in FIGURE 2 to enlarge upon immaterial details of structure. The fuel flows through line 26, check valve 27 and line 28 into the inlet 42 of the centrifugal pump 22 which includes a rotor 43 mounted on shaft 21. The rotor as illustrated rotates counterclockwise and has backwardly curved vanes 44. The centrifugal pump takes the fuel from the inlet and discharges it into a scroll 46 communicating with the discharge or delivery line 36. The check valve 27 and pump 22 may be of any standard or usual structure. However, it is desirable for the pump to have a characteristic such that pressure rises slightly as flow is throttled, which may be achieved by the use of the backwardly raked vanes as illustrated.

FIGURE 2 also illustrates the turbine pump 24 which also may be of standard type including a rotor 47 having radially extending vanes 48 on each side thereof adjacent the periphery. The rotor is mounted on shaft 23 which is coupled to shaft 21. The two shafts may be a common shaft and in this case the pumps may be of approximately the same diameter and perform satisfactorily. Fuel flows through line 32, which is somewhat smaller than the main fuel line 26, to the inlet 49 of the turbine pump and is discharged at the outlet 51 into the turbine pump discharge line 31 which enters the main fuel line 28 downstream of the check valve 27. A block 50 closely approaching the rotor closes off the outlet 51 from the inlet 49. The relief valve 33, shown somewhat schematically, may include a body 52 and a plunger 53 urged by a compression spring 54 against a seat in the body connected to the turbine pump discharge 31 by the branch line 34. The relief valve may be referenced to atmospheric pressure or preferably to the boost pressure in line 32. When the pressure in line 31 overcomes spring 54, the relief valve allows flow into line 32, thus bypassing the turbine pump to the extent necessary to prevent damage. It should be emphasized that the relief valve is provided to prevent the generation of destructive pressures in the turbine pump which, as previously pointed out, produces something like four times normal output pressure when operating into a closed output. In the gas turbine fuel system, when the engine is shut down, the fuel line to the engine is closed completely by a valve such as shutoff valve 39. Except for this shut down condition, there would be no occasion for the relief valve to operate and no reason for its presence. It is not provided to produce a constant output pressure from the turbine pump by bypassing fuel during normal operation of the pump.

The operation of the system may be clarified by reference to FIGURES 4 and 5. These are typical curves for an engine having a rated maximum speed of 14,000 r.p.m. FIGURE 4 shows several plots of pressure as a function of engine speed; and FIGURE 5 contains several plots of fuel flow in pounds per hour against engine speed. It will be appreciated that these curves are merely illustrative of typical engine requirements and pump characteristics. The curve E in FIGURE 4 is of fuel pressure required to supply the engine under standard conditions and the curve E of FIGURE 5 represents the maximum fuel requirements of the engine. The broken curves C and T in FIGURE 5 represent, respectively, the rated output of the centrifugal and turbine pumps, which both increase substantially linearly with engine speed. It will be noted that the centrifugal pump in this example has about three times the flow rating of the turbine pump.

In FIGURE 4, the parabolic curve starting at the origin and identified by the letters C and S represents the pressure characteristic of the centrifugal pump. The broken curve T represents the pressure characteristics of the turbine pump. It will be noted that the turbine pump output pressure decreases to zero well below rated engine speed, since the engine fuel requirement is greater than the flow which the turbine pump will pressurize. The curve S—S represents the total pressure delivered by the pumping system. In the low speed range of the engine this is the sum of the turbine and centrifugal pump pressure rises, and in the medium and higher speed range after the turbine pump has ceased to contribute any pressure, it amounts to the output pressure of the centrifugal pump. When the centrifugal pump is rotating at the higher speeds, it is adequate to meet engine pressure requirements. At the lower speeds, where it is inadequate, the contribution of pressure by the turbine pump added to the pressure rise of the centrifugal pump is sufficient for adequate fuel atomization with the usual fuel nozzles.

Translating this into terms of the structure shown in FIGURE 2, as the engine is cranked during start, both pumps rotate at the same or corresponding speeds, which increase with the engine speed. The turbine pump develops considerably more pressure than the centrifugal pump at low speeds, and is capable of handling the engine flow requirement at low speeds. Therefore, the check valve 27 is closed by the pressure rise across the turbine pump and the turbine pump supplies the centrifugal pump which contributes additional pressure rise to the fuel before it is delivered through line 36 to the fuel control and on to the engine.

After light-up of the engine, as speed increases and with it the fuel flow, the fuel requirement of the engine exceeds the maximum capacity of the turbine pump and its pressure rise declines to zero. As this condition is reached, the boost pressure or the suction of the centrifugal pump will open check valve 27 and the turbine pump is bypassed, the centrifugal pump supplying the full pressure and quantity of fuel. The turbine pump merely runs idle and circulates a small amount of fuel with no pressure rise. If the engine is shut down, the shutoff valve 39 will be closed, and the output pressure of the turbine pump will rise to a relatively high value, much above normal. Since such a high pressure might be destructive to the pumps or particularly to the fuel control, the relief valve is set to open at a point above the normal pressure rise of the turbine pump but much below its blocked outlet pressure; the relief valve thus opens the outlet of the turbine pump to its inlet until the engine has stopped or the valve 39 is reopened.

The system described above has the disadvantage that the turbine pump runs constantly full of fuel and, even when unloaded, requires some power input because of fluid friction. There is consequently some heating of the fuel. Neither the heating of the fuel nor the loss of power required to drive the pump is desirable. This undesirable condition is remedied by the modified system illustrated in FIGURE 3.

The system illustrated in FIGURE 3 may be identical in most respects to that of FIGURE 2, and the corresponding parts are similarly numbered. The differences amount to the provision of a shutoff valve in the inlet to the turbine pump and of a check valve in the outlet therefrom. Under most conditions, provision of these valves will make the relief valve 33 of FIGURE 2 unnecessary, so it is eliminated from FIGURE 3. The system of FIGURE 3 includes means responsive to the output pressure of the system to shut off the inlet to the turbine pump, whereupon the pump will void itself of fuel and thereafter run dry, minimizing power losses and fuel heating. Referring to FIGURE 3, the discharge line 31 of the turbine pump connects to a check valve 60 (shown schematically since it may be of any suitable type), which connects through line 31' to the centrifugal pump inlet line 28 downstream of check valve 27. The turbine pump inlet line 32 is divided into two parts 32 and 32' connected by a pressure responsive shutoff valve 62. Valve 62 comprises a body 63 slidably mounting a movable valve piston 64 having a conical end which may engage a seat 66 in the body to shut off the inlet 32 line from the outlet line 32'. The piston 64 is biased to the valve open position by a compression spring 67. The pressure in the line 32 also tends to open the valve. Valve 62 may be closed by the pressure in a chamber 68 below the piston which is connected by pressure line 71 to the pump outlet line 36. The structure of valve 62 illustrated is merely typical of various pressure responsive valves which might be employed. Also, as will be apparent, the objective of emptying pump 24 could be realized by other valving, including a manually operated valve in place of valve 62, if desired.

The system of FIGURE 3 operates similarly to that previously described until the total pump output pressure reaches some value at which valve 62 closes. As indicated in FIGURE 4, this may be the point X at which the discharge pressure of the centrifugal pump is higher than the total pressure of both pumps during the low speed operation, indicating that the centrifugal pump is handling the requirement and the turbine pump is running idle. When this pressure is reached, the valve 62 closes, shutting off the supply of fluid to the turbine pump. The pump will pump out or heat and vaporize, and in either event get rid of, the fuel in the pump through the check valve 60; thereafter it runs empty with only very small losses due to fanning of vapor rather than the relatively large fluid friction losses when it is full of fuel. With the system of FIGURE 3, once the turbine pump is empty, it cannot develop destructive pressure upon engine shutdown. For this reason, the system of FIGURE 3 may operate without the relief valve of FIGURE 2. However, it is obvious that if there may be some condition in which the outflow from the system is shut off with the turbine pump filled and turning at a sufficient rate to generate a destructive pressure, a relief valve such as 33 may be connected between lines 31 and 32'.

It will be apparent to those skilled in the art that the systems described above are particularly appropriate to the requirements of gas turbine engines making possible a lightweight, simple and relatively damage-proof pumping system and facilitating simplification of the main fuel control by the elimination of bypasses.

The detailed description of the preferred embodiments of the invention for the purpose of explaining the principles thereof are not to be considered as limiting the invention, since many modifications may be made by the exercise of skill within the scope of the invention.

I claim:

1. A fuel system for a gas turbine engine comprising, in combination, a source of fuel, said turbine pump having a volumetric capacity below engine maximum fuel requirements and having a pressure rise at low engine speed sufficient to supply the engine in low speed operation thereof, a turbine pump supplied therefrom, a centrifugal pump supplied by the turbine pump, and fuel flow controlling means interposed between the centrifugal pump and an outlet to the engine, the system including means whereby the pumps are driven concurrently by the engine, the centrifugal pump having substantially greater volumetric capacity than the turbine pump, and a conduit connecting the fuel source to the centrifugal pump and bypassing the turbine pump, the conduit including check valve means allowing flow only from the source, said check valve means opening when engine fuel requirements exceed maximum discharge pressure of said turbine pump whereby said turbine pump is bypassed and runs substantially idle while said centrifugal pump supplies all of the fuel at higher engine speeds.

2. A fuel system as recited in claim 1 including also a relief valve connecting the outlet of the turbine pump to the inlet thereof and set to open at a pressure above the discharge pressure of the turbine pump in normal operation of the system.

3. A fuel system for a gas turbine engine comprising, in combination, a source of fuel, a turbine pump supplied therefrom, a centrifugal pump supplied by the turbine pump, and fuel flow controlling means interposed between the centrifugal pump and an outlet to the engine, the system including means whereby the pumps are driven concurrently by the engine, the centrifugal pump having substantially greater volumetric capacity than the turbine pump, a conduit connecting the fuel source to the centrifugal pump and bypassing the turbine pump, the conduit including check valve means allowing flow only from the source, a second check valve connecting the turbine pump to the centrifugal pump allowing flow only from the turbine pump, and shutoff valve means interposed between the fuel source and the turbine pump.

4. A fuel system for a gas turbine engine comprising, in combination, a source of fuel, a turbine pump supplied therefrom, a centrifugal pump supplied by the turbine pump, and fuel flow controlling means interposed between the centrifugal pump and an outlet to the engine, the system including means whereby the pumps are driven concurrently by the engine, the centrifugal pump having substantially greater volumetric capacity than the turbine pump, a conduit connecting the fuel source to the centrifugal pump and bypassing the turbine pump, the conduit including check valve means allowing flow only from the source, a second check valve connecting the turbine pump to the centrifugal pump allowing flow only from the turbine pump, shutoff valve means interposed between the fuel source and the turbine pump, and means responsive to the discharge pressure of the centrifugal pump connected to and operating the said shutoff valve means.

5. A fuel system as recited in claim 4 including also a relief valve connecting the outlet of the turbine pump to the inlet thereof and set to open at a pressure above the discharge pressure of the turbine pump in normal operation of the system.

6. A fuel pumping system for a gas turbine engine comprising, in combination, a turbine pump having an inlet and an outlet, a centrifugal pump having an inlet and an outlet, means coupling the pumps to the engine for driving the pumps at a constant speed ratio, the centrifugal pump being capable of supplying maximum engine fuel requirements, the turbine pump having a volumetric capacity substantially below maximum engine fuel requirements and having a pressure rise at low engine speed sufficient to supply the engine in low speed operation thereof; a source of fuel, a shutoff valve connecting the source to the inlet of the turbine pump, check valve means connecting the inlet of the turbine pump to the inlet of the centrifugal pump, check valve means connecting the outlet of the turbine pump to the inlet of the centrifugal pump, and a fuel delivery line for connecting the outlet of the centrifugal pump to the engine.

7. A fuel pumping system for a gas turbine engine comprising, in combination, a turbine pump having an inlet and an outlet, a centrifugal pump having an inlet and an outlet, means coupling the pumps to the engine for driving the pumps at a constant speed ratio, the centrifugal pump being capable of supplying maximum engine fuel requirements, the turbine pump having a volumetric capacity substantially below maximum engine fuel requirements and having a pressure rise at low engine speed sufficient to supply the engine in low speed operation thereof; a source of fuel, a shutoff valve connecting the source to the inlet of the turbine pump, check valve means connecting the inlet of the turbine pump to the inlet of the centrifugal pump, check valve means connecting the outlet of the turbine pump to the inlet of the centrifugal pump, a fuel delivery line for connecting the outlet of the centrifugal pump to the engine, and means responsive to pressure in the delivery line operating the shutoff valve to close the same.

8. A fuel system as recited in claim 7 including also a relief valve connecting the outlet of the turbine pump to the inlet thereof and set to open at a pressure above the discharge pressure of the turbine pump in normal operation of the system.

References Cited in the file of this patent

UNITED STATES PATENTS

| | | |
|---|---|---|
| 2,532,856 | Ray | Dec. 5, 1950 |
| 2,713,244 | Chandler | July 19, 1955 |
| 2,725,932 | Ballantyne et al. | Dec. 6, 1955 |
| 2,785,634 | Marshall | Mar. 19, 1957 |
| 2,823,518 | Murray | Feb. 18, 1958 |
| 2,842,062 | Wright | July 8, 1958 |
| 2,916,875 | Morley et al. | Dec. 15, 1959 |
| 2,946,190 | Corbett | July 26, 1960 |

FOREIGN PATENTS

| | | |
|---|---|---|
| 682,295 | France | Feb. 11, 1930 |
| 788,955 | France | Aug. 5, 1935 |
| 852,290 | Great Britain | Oct. 26, 1960 |
| 307,128 | Italy | Apr. 15, 1933 |